US008453125B2

(12) United States Patent
Artzi et al.

(10) Patent No.: US 8,453,125 B2
(45) Date of Patent: May 28, 2013

(54) GENERATING INPUTS FOR CLIENT-SERVER PROGRAMS FOR FAULT-DETECTION AND LOCALIZATION

(75) Inventors: Shay Artzi, Brookline, MA (US); Julian Dolby, Bronx, NY (US); Marco Pistoia, Amawalk, NY (US); Frank Tip, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/966,556

(22) Filed: Dec. 13, 2010

(65) Prior Publication Data

US 2012/0151454 A1 Jun. 14, 2012

(51) Int. Cl.
*G06F 9/44* (2006.01)

(52) U.S. Cl.
USPC ............................. 717/131; 717/127; 717/132

(58) Field of Classification Search
None
See application file for complete search history.

(56) References Cited

U.S. PATENT DOCUMENTS

| | | | | |
|---|---|---|---|---|
| 7,089,537 | B2 * | 8/2006 | Das et al. ........................ | 717/132 |
| 2005/0060691 | A1 * | 3/2005 | Das et al. ........................ | 717/132 |
| 2009/0125976 | A1 * | 5/2009 | Wassermann et al. ......... | 717/131 |
| 2010/0005454 | A1 * | 1/2010 | Sankaranarayanan et al. ............................... | 717/127 |
| 2010/0242029 | A1 * | 9/2010 | Tkachuk et al. ................ | 717/131 |
| 2010/0281469 | A1 * | 11/2010 | Wang et al. ..................... | 717/131 |
| 2011/0016356 | A1 * | 1/2011 | Artzi et al. ...................... | 717/131 |
| 2011/0016456 | A1 * | 1/2011 | Artzi et al. ...................... | 717/131 |
| 2011/0016457 | A1 * | 1/2011 | Artzi et al. ...................... | 717/131 |
| 2011/0030061 | A1 * | 2/2011 | Artzi et al. ...................... | 717/127 |
| 2011/0289488 | A1 * | 11/2011 | Ghosh ............................ | 717/131 |

OTHER PUBLICATIONS

Hao et al., "Test input reduction for result inspection to facilitate fault localization", Aug. 2009, Springer Science, pp. 1-31; <http://people.engr.ncsu.edu/txie/publications/jase10-faultloc.pdf>.*
Delahaye et al., "µTIL: Mutation-based Statistical Test Inputs Generation for Automatic Fault Localization", 2012 IEEE; pp. 197-206; <http://ieeexplore.ieee.org/stamp/stamp.jsp?arnumber=06258309>.*
Baudry et al., "Improving Test Suites for Efficient Fault Localization", 2006 ACM, pp. 82-91; <http://dl.acm.org/citation.cfm?id=1134285.1134299&coll=DL&dl=GUIDE&CFID=168903075&CFTOKEN=21193182>.*
Cadar, C., et al., "EXE: Authomatically Generating Inputs of Death," CCS '06, Oct. 30-Nov. 3, 2004, Alexandria, Virginia, USA, Copyright 2006, ACM 1-59593-518-5/06/0010.

(Continued)

*Primary Examiner* — Thuy Dao
*Assistant Examiner* — Ben C Wang
(74) *Attorney, Agent, or Firm* — Jon A. Gibbons; Fleit Gibbons Gutman Bongini & Bianco PL

(57) ABSTRACT

The present invention provides a system, computer program product, and a computer implemented method for analyzing a set of two or more communicating applications. The method begins with receiving a first second application that communicates with each other during execution. Next, an initial input for executing the first application and the second application is received. The initial input is added to a set of inputs. An iterative execution loop is performed at least once. The loop begins with selecting inputs out of the set of inputs for execution. Next, using the selected inputs, the first and/or the second application is executed while information regarding the execution and information communicated to the other application are recorded. A set of one or more new application inputs for either applications is generated based the second application recorded information and the first application information. These new inputs are added to the set of inputs.

24 Claims, 13 Drawing Sheets

OTHER PUBLICATIONS

Godefroid, P., et al., "DART: Directed Automated Random Testing," PLDI '05, Jun. 12-15, 2005, Chicago, Illinois, USA, Copyright 2005 ACM 1-59593-080-9/05/0006.

Godefroid, P., et al., "Automated Whitebox Fuzz Testing," NDSS 2008.

Sen, K., et al., "CUTE: A Concolic Unit Testing Engine for C," ESEC-FSE'05, Sep. 5-9, 2005, Lisbon, Portugal, Copyright 2005, ACM 1-59593-014-0/05/0009.

Wassermann, G., et al., "Dynamic Test Input Generation for WEB Applications," ISSTA '08, Jul. 20-14, 2008, Seattle, Washington, USA, Copyright 2008, ACM 978-1-59593-904-3/08/07.

Artzi, S., et al., "A Framework for Automated Testing of JavaScript Web Applications," IXAW '11, May 21-28, 2011, Honolulu, Hawaii, USA, Copyright 2011 ACM 978-a-4503-0445-0/11/05.

Artzi, S., et al., "Finding Bugs in Web Applications Using Dynamic Test Generation and Explicit State Model Checking," IEEE Transactions on Software Engineering, 2010.

Artzi, S., et al., "Practical Fault Localization for Dynamic Web Applications," ICSE '10, May 2-8, Cape Town, South Africa, Copyright 2010 ACM 978-1-60558-719-6/10/05.

Artzi, S., et al., "Directed Test Generation for Effective Fault Localization," ISSTA '10, Jul. 12-16, 2010, Trento, Italy, Copyright 2010 ACM 978-1-60558-823-0/10/07.

* cited by examiner

| TIME (202) | 1ST APPLICATION (E.G. CLIENT) (204) | SET OF CLIENT I/O $C_I/C_O$ "A" denotes analyzed (206) | SET OF SERVER I/O $S_I/S_O$ "A" denotes analyzed (208) | 2ND APPLICATION (E.G. SERVER) (210) |
|---|---|---|---|---|
| T0 | • SELECT SOME INPUTS I FROM THE SET $C_0$.<br>• EXECUTE CONCRETELY AND SYMBOLICALLY ON I.<br>• RECORD PATH CONSTRAINTS P AND INFORMATION COMMUNICATED TO THE SECOND APPLICATION.<br>• USE P TO GENERATE NEW CLIENT INPUTS, AND ADD THEM TO SET $C_I$.<br>• RECORD CLIENT OUTPUT FOR SERVER AS $C_O$. | $C_I = \{C_{T0i}\}$<br>$C_O = \{\emptyset\}$ | $S_I = \{S_{T0i}\}$<br>$S_O = \{\emptyset\}$ | • SELECT SOME INPUTS I FROM THE SET $S_I$.<br>• EXECUTE CONCRETELY AND SYMBOLICALLY ON I.<br>• RECORD PATH CONSTRAINTS P AND INFORMATION COMMUNICATED TO THE FIRST APPLICATION.<br>• USE P TO GENERATE NEW SERVER INPUTS, AND ADD THEM TO SET $S_I$.<br>• RECORD SERVER OUTPUT TO CLIENT $S_O$. |
| T1 | • SELECT SOME INPUTS I FROM THE SET $C_0$ AND $S_I$.<br>• EXECUTE CONCRETELY AND SYMBOLICALLY ON I.<br>• RECORD PATH CONSTRAINTS P AND INFORMATION COMMUNICATED TO THE SECOND APPLICATION.<br>• USE P TO GENERATE NEW CLIENT INPUTS, AND ADD THEM TO SET $C_I$.<br>• RECORD CLIENT OUTPUT FOR SERVER AS $C_O$. | $C_I = \{C_{T0i}, C_{T1i}, AS_{T0o}\}$<br>$C_O = \{C_{T0o}, C_{T1o}\}$ | $S_I = \{S_{T0i}, S_{T1i}, AC_{T0o}\}$<br>$S_O = \{S_{T0o}, S_{T1o}\}$ | • SELECT SOME INPUTS I FROM THE SET $S_I$ AND $C_O$.<br>• EXECUTE CONCRETELY AND SYMBOLICALLY ON I.<br>• RECORD PATH CONSTRAINTS P AND INFORMATION COMMUNICATED TO THE FIRST APPLICATION.<br>• USE P TO GENERATE NEW SERVER INPUTS.<br>• RECORD SERVER OUTPUT TO CLIENT $S_O$. |

FIG. 2A

| | | | |
|---|---|---|---|
| T2 | • SELECT SOME INPUTS I FROM THE SET $C_0$ AND $S_1$.<br>• EXECUTE CONCRETELY AND SYMBOLICALLY ON I.<br>• RECORD PATH CONSTRAINTS P AND INFORMATION COMMUNICATED TO THE SECOND APPLICATION.<br>• USE P TO GENERATE NEW CLIENT INPUTS, AND ADD THEM TO SET $C_1$.<br>• RECORD CLIENT OUTPUT FOR SERVER AS $C_0$. | $C_1 = \{CT_{0i}, CT_{1i}, CT_{2i}, AST_{0o}, AST_{1o}\}$<br><br>$C_0 = \{CT_{0o}, CT_{1o}, CT_{2o}\}$ | $S_1 = \{ST_{0i}, ST_{1i}, ST_{2i}, ACT_{0o}, ACT_{1o}\}$<br><br>$S_0 = \{ST_{0o}, ST_{1o}, ST_{2o}\}$ | • SELECT SOME INPUTS I FROM THE SET $S_1$ AND $C_0$.<br>• EXECUTE CONCRETELY AND SYMBOLICALLY ON I.<br>• RECORD PATH CONSTRAINTS P AND INFORMATION COMMUNICATED TO THE FIRST APPLICATION.<br>• USE P TO GENERATE NEW SERVER INPUTS.<br>• RECORD SERVER OUTPUT TO CLIENT AS $S_0$. |
| ⋮ | ⋮ | ⋮ | ⋮ | ⋮ |
| TN | • SELECT SOME INPUTS I FROM THE SET $C_1$ AND $S_0$.<br>• EXECUTE CONCRETELY AND SYMBOLICALLY ON I TO RECORD PATH CONSTRAINTS P AND INFORMATION COMMUNICATED TO THE SECOND APPLICATION.<br>• USE P TO GENERATE NEW CLIENT INPUTS, AND ADD THEM TO SET $C_1$.<br>• RECORD CLIENT OUTPUT FOR SERVER AS $C_0$. | $C_1 = \{CT_{0i}, CT_{1i}, CT_{2i}, CT_{2N}, AST_{0o}, AST_{1o}, AST_{2o}\}$<br><br>$C_0 = \{CT_{0o}, CT_{1o}, CT_{2o}, C_{TNo}\}$ | $S_1 = \{ST_{0i}, ST_{1i}, ST_{2i}, ST_{2N}, ACT_{0o}, ACT_{1o}, ACT_{2o}\}$<br><br>$S_0 = \{ST_{0o}, ST_{1o}, ST_{2o}, S_{TNo}\}$ | • SELECT SOME INPUTS I FROM THE SET $S_1$ AND $C_0$.<br>• EXECUTE CONCRETELY AND SYMBOLICALLY ON I.<br>• RECORD PATH CONSTRAINTS P AND INFORMATION COMMUNICATED TO THE FIRST APPLICATION.<br>• USE P TO GENERATE NEW SERVER INPUTS.<br>• RECORD SERVER OUTPUT TO CLIENT AS $S_0$. |
| FINAL | | $C_1 = \{CT_{0i}, CT_{1i}, CT_{2i}, CT_{2N}, AST_{0o}, AST_{1o}, AST_{2o}\}$<br><br>$C_0 = \{CT_{0o}, CT_{1o}, CT_{2o}, C_{TNo}\}$ | $S_1 = \{ST_{0i}, ST_{1i}, ST_{2i}, ST_{2N}, ACT_{0o}, ACT_{1o}, ACT_{2o}, ACT_{No}\}$<br><br>$S_0 = \{ST_{0o}, ST_{1o}, ST_{2o}, S_{TNo}\}$ | |

FIG. 2B

```
<HTML>
<HEAD>
<TITLE>Example for input generation patent</TITLE>
<SCRIPT> function getJSONResponse(url, handler)
{
  xmlhttp=new XMLHttpRequest()
  xmlhttp.onreadystatechange=function () {
   if (xmlhttp.readyState>=4) {
    handler( eval(xmlhttp.responseText) );
   }
  }
  xmlhttp.open("GET",url,true);
  xmlhttp.send(null);
} function writeItem(item) {
  var action;
  if (item.subMenu == 1) {
    action = "javascript:updateItems('" + item.id + "');";
  } else {
    action = "\"http://fixme.com/buy?item=" + item.id + "\"";
  } desc = "javascript:describeItem('" + item.id + "');";

return "<LI> <A HREF=" + action + ">" + item.name + "</A> " + "
(<A HREF=" + desc + ">describe " + item.name + "</A>)";

} function describeItem(menuItem) {
  getJSONResponse(
    "http://localhost:8888/example/server.php?act=describe&item=" +
  menuItem,
    function (jsonData) {
      document.getElementById("description").value = jsonData.text;
   }
 );
}
```

FIG. 4

```
function updateItems(menuItem) {
  getJSONResponse(
    "http://localhost:8888/example/server.php?act=get&item=" +
menuItem,
  function (jsonData) {
    var innerHTMLText = "<UL> ";
      for(var i = 0; i < jsonData.size; i++) {
        innerHTMLText += writeItem(jsonData[i]);
      }
      document.getElementById("content").innerHTML = innerHTMLText
 + "</UL>";
    }
  );
}
</SCRIPT>
</HEAD>
<BODY>
<DIV id="content">
<P>items go here</P>
</DIV>
<HR>
<INPUT TYPE="textarea" size="40" value="description goes here..."
id="description"/>
<BR>
<INPUT TYPE="button" value="Go to main menu"
onclick="updateItems('root')"/>
</BODY>
</HTML>
```

FIG. 5

```
<?
$con = mysql_connect("localhost", "root", "example") or die(mysql_error());
mysql_select_db("patent_example") or die(mysql_error());

if ($_REQUEST['act'] == 'describe') {
  $query = 'SELECT text FROM descriptions WHERE id = "'. $_REQUEST['item'] . '"';
  $result = mysql_query($query);

$row = mysql_fetch_array($result);

echo "x = { text: '" . $row['text'] . "'}; x;";

} else {
  $query = 'SELECT * FROM items WHERE parent_id = "' . $_REQUEST['item'] . '"';
  $result = mysql_query($query);

$count = 0;
  while($row = mysql_fetch_array($result)) {
  $obj = "{ id: '" . $row['id'] . "'" .
  ", name: '" . $row['name'] . "'" .
  ", subMenu: " . $row['subMenu'] .
  ", price: " . $row['price'] . "}";
  $elts = $elts . ", " . $count . ": " . $obj;
  $count++;
  }

$data = "x = { size: " . $count . $elts . "}; x;";

echo $data;
} mysql_close($con);
die();
?>
```

FIG. 6

```
-- MySQL dump 10.13 Distrib 5.1.50, for apple-darwin9 (x86_64)
--
-- Host: localhost  Database: patent_example
-- ------------------------------------------------------
-- Server version 5.1.50-log /*!40101 SET @OLD_CHARACTER_SET_CLIENT=@@CHARACTER_SET_CLIENT */;
/*!40101 SET @OLD_CHARACTER_SET_RESULTS=@@CHARACTER_SET_RESULTS */;
/*!40101 SET @OLD_COLLATION_CONNECTION=@@COLLATION_CONNECTION */;
/*!40101 SET NAMES utf8 */;
/*!40103 SET @OLD_TIME_ZONE=@@TIME_ZONE */;
/*!40103 SET TIME_ZONE='+00:00' */;
/*!40014 SET @OLD_UNIQUE_CHECKS=@@UNIQUE_CHECKS, UNIQUE_CHECKS=0 */;
/*!40014 SET @OLD_FOREIGN_KEY_CHECKS=@@FOREIGN_KEY_CHECKS, FOREIGN_KEY_CHECKS=0 */;
/*!40101 SET @OLD_SQL_MODE=@@SQL_MODE, SQL_MODE='NO_AUTO_VALUE_ON_ZERO' */;
/*!40111 SET @OLD_SQL_NOTES=@@SQL_NOTES, SQL_NOTES=0 */;

--
-- Table structure for table `descriptions`
--

DROP TABLE IF EXISTS `descriptions`;
/*!40101 SET @saved_cs_client     = @@character_set_client */;
/*!40101 SET character_set_client = utf8 */;
CREATE TABLE `descriptions` (
`id` varchar(10) DEFAULT NULL,
`text` varchar(1000) DEFAULT NULL
) ENGINE=MyISAM DEFAULT CHARSET=utf8;
/*!40101 SET character_set_client = @saved_cs_client */;

--
-- Dumping data for table `descriptions`
--
```

FIG. 7

LOCK TABLES `descriptions` WRITE;
/*!40000 ALTER TABLE `descriptions` DISABLE KEYS */;
INSERT INTO `descriptions` VALUES ('phones','a list of all available phones'),('tvs','a list of all available televisions'),('ip3','a cool phone'),('ip3s','a very cool phone'),('ip4','the coolest phone ever');
/*!40000 ALTER TABLE `descriptions` ENABLE KEYS */;

UNLOCK TABLES;

--
-- Table structure for table `items`
--

DROP TABLE IF EXISTS `items`;
/*!40101 SET @saved_cs_client = @@character_set_client */;
/*!40101 SET character_set_client = utf8 */;
CREATE TABLE `items` (
`id` varchar(10) DEFAULT NULL,
`name` varchar(100) DEFAULT NULL,
`subMenu` int(11) DEFAULT NULL,
`price` int(11) DEFAULT NULL,
`parent_id` varchar(10) DEFAULT NULL
) ENGINE=MyISAM DEFAULT CHARSET=utf8;
/*!40101 SET character_set_client = @saved_cs_client */;

--
-- Dumping data for table `items`
--

LOCK TABLES `items` WRITE;
/*!40000 ALTER TABLE `items` DISABLE KEYS */;
INSERT INTO `items` VALUES ('root','top level menu',1,-1,''),('phones','All Phones',1,-1,'root'),('tvs','All Televisions',1,-1,'root'),('ip3','iPhone 3G',-1,99,'phones'),('ip3s','iPhone 3GS',-1,99,'phones'),('ip4','iPhone 4',-1,199,'phones');
/*!40000 ALTER TABLE `items` ENABLE KEYS */;
UNLOCK TABLES;
/*!40103 SET TIME_ZONE=@OLD_TIME_ZONE */;

FIG. 8

/\*!40101 SET SQL_MODE=@OLD_SQL_MODE \*/;
/\*!40014 SET FOREIGN_KEY_CHECKS=@OLD_FOREIGN_KEY_CHECKS \*/;
/\*!40014 SET UNIQUE_CHECKS=@OLD_UNIQUE_CHECKS \*/;
/\*!40101 SET CHARACTER_SET_CLIENT=@OLD_CHARACTER_SET_CLIENT \*/;
/\*!40101 SET CHARACTER_SET_RESULTS=@OLD_CHARACTER_SET_RESULTS \*/;
/\*!40101 SET COLLATION_CONNECTION=@OLD_COLLATION_CONNECTION \*/;
/\*!40111 SET SQL_NOTES=@OLD_SQL_NOTES \*/;

-- Dump completed on 2010-08-31 10:20:26

FIG. 9

```
     parameters: (P Program, S_0 Initial environment state,C Components
                 executable from S_0 ,O oracle;
     P,C:setOf(Executable component);
     result : Bug reports B;
     B:setOf({failure,setOf('Ttest)});
     T :{Executable component, Path constraint, Environment State}
  1  B:=0;
  2  pcQueue:=emptyQueue();
  3  foreach component in C do
  4     test:= {component, emptyPathconstraint( );S_0 };
  5     enqueue(pcQueue ,test;
  6  while not empty(pcQueue) and not timeExpired() do
  7     test= dequeue(pcQueue);
  8     component =test:component:
  9     input:= solve(test:path Constraint);
 10     if input,≠⊥ then
 11        restoreState(test,state);
 12        output: = execute Concrete (component,input);
 13        newState:=getCurrentState();
 14        failures:= getFailures(O:output);
 15        foreach f in failures do
 16           merge {f,test} into '13;
 17        c_1^ ...^ c_n:=executeSymbolic(component,input);
 18        foreach i=1,...,n do
 19           newPC=c_1^ ...^ c_{i-1} ^ -c_i;
 20           newTest:= {test, component,newPC, test.state};
 21           enqueue (pcQueue ,newTest);
 22        {PC_1,component }^ ...^{ PC_m ;component_m}=
              analyzeOutput(output);
 23        foreach i=1,... ,m do
 24           newPC:=c_1^ ...^ c_n ^ PC_i:
 25           newTest:={component_i,newPC,newState };
 26           if pcQueue does not contain newTest then
 27              enqueue(pcQueue ,newTest);
 28     return B
```

FIG. 10

GENERATING INPUTS FOR CLIENT-SERVER PROGRAMS FOR FAULT-DETECTION AND LOCALIZATION

CROSS-REFERENCE TO RELATED APPLICATIONS

Not Applicable.

STATEMENT REGARDING FEDERALLY SPONSORED RESEARCH

Not Applicable

BACKGROUND

Web applications are typically written in a combination of several programming languages (e.g., JavaScript on the client side, and Hypertext Processor Pages (PHP) with embedded Structured Query Language (SQL) commands on the server side), and generate structured output in the form of dynamically generated HyperText Markup Language (HTML) pages that may refer to additional scripts to be executed. Since the application is built using a complex mixture of different languages, programmers may inadvertently make mistakes and introduce faults in the applications, resulting in web application crashes and malformed dynamically-generated HTML pages that can seriously impact usability.

Moreover, construction of test cases for such applications might require inputs for both the client and the server and can be difficult and tedious. Often times, inputs must be generated and selected by hand and this can be challenging when the goal is to achieve increased test coverage.

SUMMARY

The present invention overcomes many problems associated with automatic fault detection and localization in dynamic web applications. The present invention provides a system, computer program product, on-demand service, and a computer implemented method for analyzing a set of two or more communicating applications comprising a plurality of code fragments. The method begins with receiving a first and second application that communicates with each other during execution. In one embodiment, the first application is client code, such as Java®, and the second application is server code such as PHP. In another embodiment, a portion of the first application, e.g. client code, is generated by the second application, e.g. server code. In such scenarios, the present invention can receive only a portion of code fragments for the first application and the second application. In another embodiment, an initial state of an environment for executing the first application and the second application is also received. Next, an initial input for executing the first application and the second application is received. The initial input is added to a set of inputs. An execution loop is entered and preformed at least once. The loop includes selecting inputs out of the set of inputs for execution. The first and/or second application is executed and the execution information and information communicated to the other application are stored. Using the stored information, a set of one or more new inputs is generated for the first and second applications. These new inputs are added to the set of inputs, which are then processed in subsequent iterations of the execution loop. In one embodiment the execution is random feedback directed execution and in another embodiment the execution is done concretely and symbolically to record a path constraint as part of the execution information.

In one embodiment, the execution loop is repeated until a coverage budget for at least one of the first application and second application is met and/or a given budget for a number of faults for at least one of the first application and second application is met and/or a time budget is met and/or a computational budget is met.

The present invention leverages two existing feedback generation techniques—combined concrete and symbolic execution of server-side PHP applications as embodied in the Apollo framework [7], and feedback-directed random testing of client-side JavaScript Web Applications, as embodied in the Artemis [6] framework. The present invention extends combined concrete and symbolic execution to the domain of dynamic web applications by automatically simulating user interaction. The method automatically discovers inputs required to exercise paths through a program. The resulting set of test inputs is automatically generated, thus overcoming the limitation of many existing fault-localization techniques that a test suite be available upfront.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 2 is a table illustrating the progression of client input/output and server input/output being generated over time.

FIGS. 4-5 is example JavaScript client code illustrating how inputs are generated with the server code in FIG. 6 using the MYSQL database code in FIGS. 7-9.

FIG. 6 is example Asynchronous JavaScript and XML (AJAX) server code illustrating how inputs are generated with the client code in FIGS. 4-5.

FIGS. 7-9 is example MYSQL code that works along with the server code of FIG. 6.

FIG. 10 shows pseudo-code for the failure detection algorithm to implement an input analyzer.

DETAILED DESCRIPTION

Figure 1:
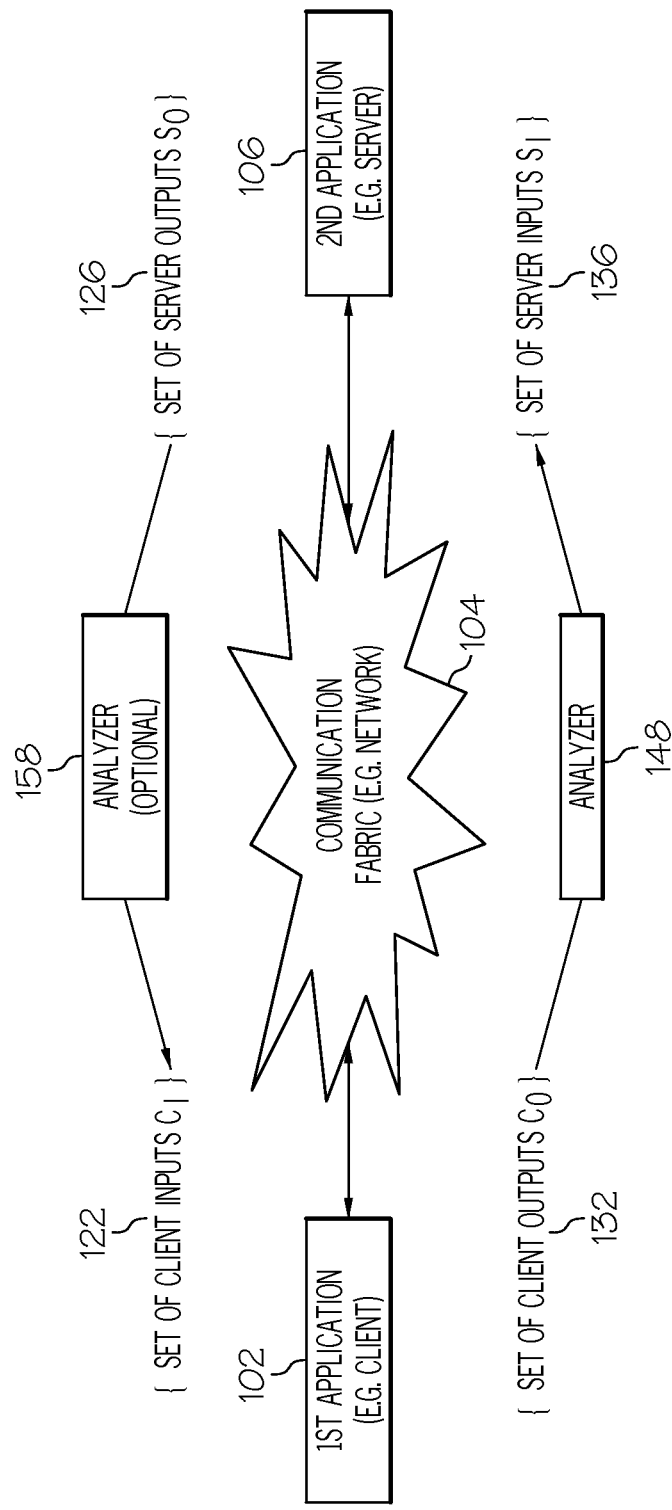
FIG. 1 is a functional diagram of a client server system illustrating the relationship of client input/output to server input/outputs.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals, refer to like parts through several views.

Overview OF Client-Server I/O

FIG. 1 is a functional diagram of a client server system illustrating the relationship of client input/output to server input/outputs. Shown is a first application 102, such as a client, communicating over a communications fabric 104, such as a wired or wireless network, to a second application 106, such as a server application. During execution, a set of client outputs $C_O$ 132 from the first application 102 are made available over the communications fabric 104 to the second application 106 as a set of server inputs $S_I$ 136. These client outputs $C_O$ are also sent to an analyzer 148, to understand and analyze the different options possible for server inputs $S_I$ 136. One embodiment the analyzer 148 is an automatic "Input Generator" as described in inventors own previous work Apollo [7, 8, 9] in which the following components are described—UI (User Interface) Option Analyzer, Symbolic Driver, Constraint Solver, and Value Generator with reference to a failure detection algorithm which is reproduced in FIG. 10.

In an analogous manner, outputs from the second application 106, e.g. the server application outputs $S_O$ 126 are made available over the communications fabric 104 to the first application 102 as a set of client inputs $C_I$ 122. There may be an optional analyzer 158 to analyze and understand the server output $S_O$ 126 before the client inputs $C_I$ 122. This optional analyzer 158 can be implemented in the same manner analyzer 148 is implement above. Execution of each of the client and server results in additional control flow paths being exercised. This process is repeated until either there is sufficient coverage of the statements in the application or until the time budget is exhausted.

Analyzer 148 is now described with reference to the coding example shown in FIGS. 4-9. These figures are further described in the following sections. As a brief overview, FIGS. 4 and 5 show example JavaScript client code generated by the example AJAX server code of FIG. 6. FIGS. 7-9 show example MYSQL database code that works along with the server code of FIG. 6.

Most typical Web sites include different links selectable by the client that result in different calls to the server. In this example, JavaScript client code is sent from the server. Multiple options are possible, such as adding an item to a shopping cart, checking out, and reviewing the privacy policy. The analyzer 148 analyzes all the types of calls made by the client to the server (for example, check out, add an item, etc.) and learns from the calls what options are possible.

Concrete and Symbolic Testing

In the inventors' previous work [7, 8, 9], the technique of combined concrete and symbolic execution [1, 2, 3, 4, 5] was adapted to Web applications written in PHP. In this approach, the application is first executed on an empty input, and a path condition is recorded that reflects the control flow predicates in the application that have been executed. By changing one of the predicates in the path condition, and solving the resulting condition, additional inputs can be obtained.

In the present invention combined concrete and symbolic testing is enhanced by supporting automatic dynamic simulation of user interactions, as implemented in the inventor's Apollo tool [7]. This tool records the environment state (database, sessions, cookies) after executing each script, analyzes the output of the script to detect the possible user options that are available, and restores the environment state before executing a new script based on detected user options. A sister tool of Apollo [7], called Artemis [6], was developed by the inventors for automated feedback-directed test generation for client-side web-applications written in JavaScript.

The use of combined concrete and symbolic execution to obtain passing and failing runs overcomes the limitation of other existing fault localization techniques that a test suite with passing and failing runs be available up-front.

The contributions of the present invention are as follows:
1. A flexible framework for automated feedback-directed test generation for both client and server applications communicating in a client-server environment.
2. An extension of the inventor's previous Apollo and Artemis tools to form a new combined tool.

Progression of Client-Server I/O Over Time

FIG. 2 is a table illustrating the progression of client input/output and server input/output being generated over time. Time, denoted in time column 202, starts at $T_0$ increasing through $T_N$. A progression of client I/O and server I/O will now be explained. Again, the client application 102 and server application 106, denoted in column 210, are in communication over communication fabric 104. A set of first application input/output (I/O) 102, such as client input 122 and client output 132, is shown in column 206. A set of second application input/output (I/O) 106, such as server input 126 and server output 136, is shown in column 208. This set of server application 106 input in column 206 may include input produced by the client application 102 in column 204. As described above, the client output may be processed by an optional analyzer 158 to generate server input.

Starting with column 202, the first row denoted $T_0$, an initial set of client inputs I is selected from the set of $C_I=\{C_{T0i}\}$ as shown. This initial set $C_{T0i}$ is provided to the client program 102. The initial set of client inputs I is executed concretely and symbolically with the first application 102, e.g. client application. Path constraints P and the information is communicated to the second application 106, e.g. server application, is recorded. Because the first application 102 has just began execution at T0, there is no output denoted by empty set $C_0=\{\emptyset\}$ until the time period T1. Further, it is important to note that the set of server input $C_{T0i}$ could be empty i.e. $\{\emptyset\}$ in those class of programs where the server does not need initial client input. In this embodiment, the client application 102 denoted in column 204, is first executed on an empty input, and a path condition is recorded that reflects the control flow predicates in the application that have been executed. By changing one of the predicates in the path condition, and solving the resulting condition, additional inputs can be obtained. More specifically, using the path constraints P, new client inputs I are created and added to the set $\{C_{T0i}\}$. These additional inputs are typically processed by analyzer 148. The client outputs $C_0$ are recorded, for use in the next iteration.

Continuing further, an initial set of server inputs I is selected from the set $S_I=\{S_{T0i}\}$ as shown. Using the set of server inputs I, the second application 106, e.g. server application, is executed concretely and symbolically. Path constraints P are recorded, and information is communicated to the first application 102. These path constraints P are used to generate new server inputs $S_I$ and added to the set $\{S_{T0i}\}$. These additional inputs may be optionally processed by analyzer 158. The server outputs $S_O$ are recorded. It is important to note that since the second application is just begun executing there is no server output denoted by empty set $S_0=\{\emptyset\}$, until the time period T1 in column 202.

Continuing with column 202, at the row denoted T1, the process repeats for the first application 102 and the second application 106. However, notice how the set of client inputs $C_I$ has grown and has become $C_I=\{C_{T0i}, C_{T1i}, AS_{T0o}\}$, which represents the initial input $C_{T0i}$ and input $C_{T1i}$ at T1, plus the output $AS_{T0i}$ of the second application 106 after executing time T0. The "A" on the output $AS_{T0i}$ of the second application 106 denotes being processed by an optional analyzer 158. Likewise notice the client output has grown $C_O = \{C_{T0o}, C_{T1o}\}$ which represents the initial output $C_{T0o}$ plus the output $C_{T1o}$ of the first application 104 after executing time T0 in column 202. In a similar fashion, the process repeats for the second application 106. Again, notice how the set of server inputs has grown $S_I = \{S_{T0i}, S_{T1i}, AC_{T0o}\}$ which represents the initial input $S_{T0i}$ and input $S_{T1i}$ at T1, plus the output $C_{T0i}$ of the first application 104 after executing time T0. Again, the "A" on the output $AC_{T0o}$ of the first application 102 denote being processed by an analyzer 148 and after being processed by optional analyzer 158. Likewise notice the server output has grown $S_O = \{S_{T0o}, S_{T1o}\}$ which represents the initial output $S_{T0o}$ plus the output $S_{T1o}$ of the second application 104 after executing time T0.

This process continues through N time periods TN until a coverage budget for at least one of the first application and second application is met and/or a given budget for a number of faults for at least one of the first application and second application is met and/or a time budget is met and/or a computational budget is met.

In the final row the results of all the client I/O and server I/O is shown. The client inputs has grown $C_I = \{C_{T0i}, C_{T1i}, C_{T2i}, C_{T2N}, AS_{T0o}, AS_{T1o}, AS_{T2o}, AS_{TNo}\}$ which represents the input $C_I$ plus the analyzed output So through N period of time Likewise, the final row the results of all the client I/O and server I/O is shown. The client inputs has grown $S_I = \{S_{T0i}, S_{T1i}, S_{T2i}, S_{T2N}, AC_{T0o}, AC_{T1o}, AC_{T2o}, AC_{TNo}\}$ which represents the input of second application 106 $S_I$ plus the analyzed output of first application 104 Co through N period of time.

Flow Diagram of Localizing Faults in Client Server Environment

Figure 3:
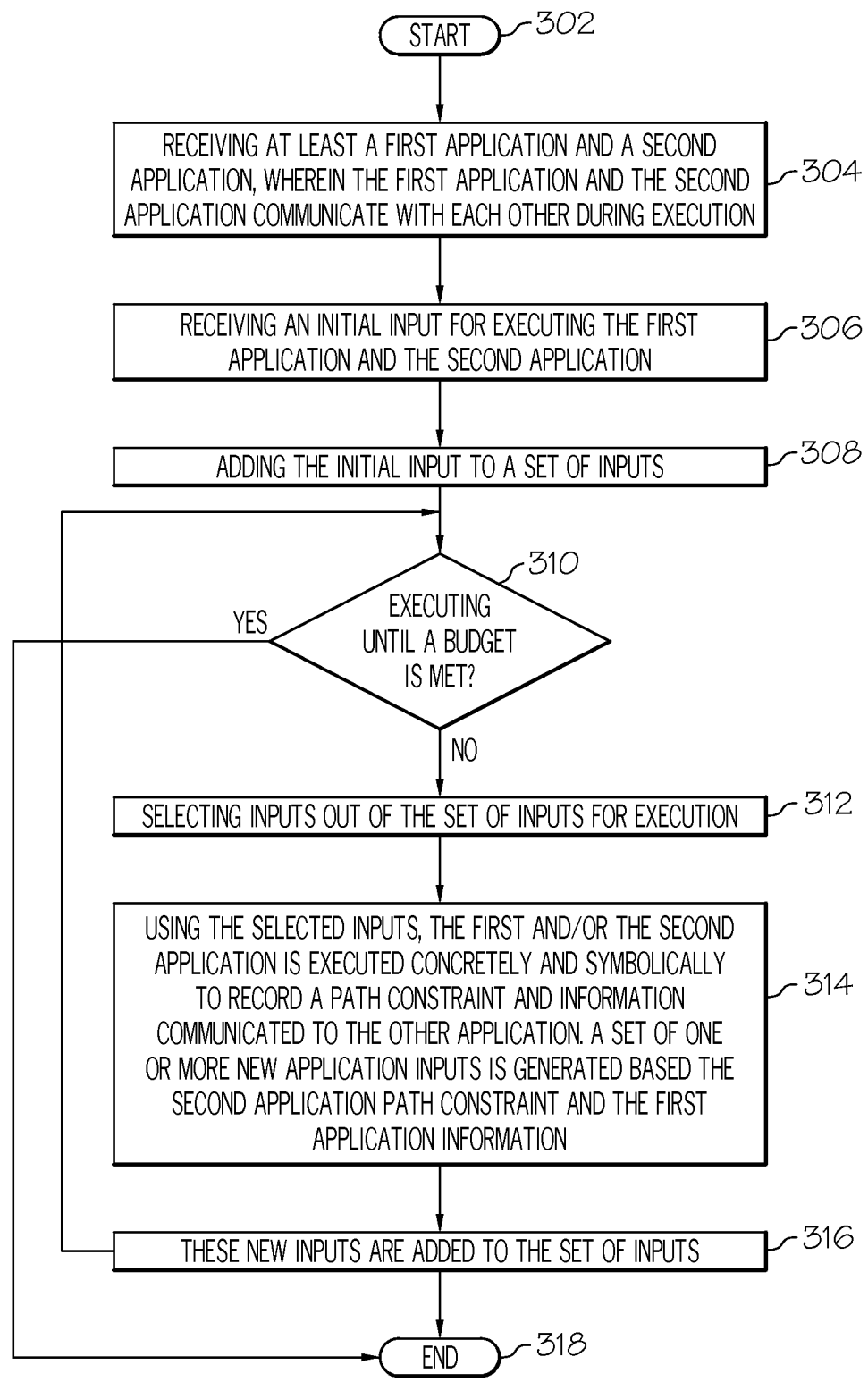
FIG. 3 is a flow diagram of the computer implemented method of example for localizing faults in a client-server architecture.

Reference is now made to FIG. 3. Shown is a flow diagram of the computer implemented method of example for localizing faults in a client-server architecture. The process begins at step 302 and immediately proceeds to step 304, where the code fragments as part of a first application, such as a client application 102, and the code fragments as part of a second application, such as a server application 106, are received. The first application and the second application communicate during execution over a communication fabric 104. In one embodiment, the communication between the first application and the second application is via message passing. In another embodiment, the execution of the second application, such as a server PHP application or Ajax, causes a flow of information between the first and second application. An example of the flow of information is the execution of the first application, such as a client Java application, causes a change of state in the second application. Another example of the flow of information is a change in control flow in the second application. It is important to note that the present invention is not limited to a server-side PHP application and a client-side JavaScript applications and the any programming language is within the true scope and spirit of the present invention.

The first application and the second application can be part of an N-tiered distributed program as further described at below in the section entitled "N-Tiered Architecture". Next in step 306, an initial input for executing the first application and the second application is received. Optionally, an initial state of an environment for executing the first application and the second application is also received. This initial input is added to a set of inputs e.g. $C_I$ and/or $S_I$ in step 308. In one embodiment, the set of initial inputs on during the first pass of the execution loop may only contain an empty set, e.g., $C_i = \{\emptyset\}$ and/or $S_i = \{\emptyset\}$.

The loop 312 begins with selecting inputs out of the set of inputs for execution in step 312. Next, in step 314, using the selected inputs, the first and/or the second application is executed concretely and symbolically to record a path constraint and information communicated to the other application. A set of one or more new application inputs is generated based the second application path constraint and the first application information that is communicated from the first application to the second application. These new inputs are added to the set of inputs in step 316. In one embodiment, the inputs from each of the first application and second application are kept in separate sets, such as client inputs and server inputs. Moreover, an analyzer 148 is typically deployed between the client outputs and server inputs as shown in FIG. 1 to analyzer and understand the different options possible. Also as shown in FIG. 1, an optional analyzer 158 may be deployed between the server outputs and the client inputs as well.

The process terminates in steps 310, and 318 once a coverage budget for at least one of the first application and second application is met and/or a given budget for a number of faults for at least one of the first application and second application is met and/or a time budget is met and/or a computational budget is met.

Example Client Code and Server Code Example For Input Generation

Example client application 102 and server application 106 will now be discussed. Shown in FIGS. 4-5 is an example JavaScript client code illustrating how additional inputs are generated with the server code in FIG. 6 using the MYSQL database code in FIGS. 7-9.

The client application in the JavaScript code of FIGS. 4-5 displays lists of items to buy, along with item descriptions and a mechanism for navigating the menus. The server-side code in FIG. 6 accesses a MYSQL database in FIGS. 7-9 to respond to requests for data from the client, but does not interact directly with the user.

There are two forms of input to be generated. The first is request parameters passed to the server. As the client executes, looking at different lists of items to buy, values for the 'item' parameter are obtained from the items in the lists. Thus, running the client is crucial to obtaining a good set of inputs for the server. Similarly, the 'describe' and 'get' values for the 'act' parameter can be obtained from the client code in FIGS. 4-5.

The second form of input is data passed to the client from the server by the JavaScript and the XMLHttpRequest object. This provides a method for exchanging data asynchronously between the browser and the server while avoiding full page reloads. The data coming back is in JavaScript-Object-Notation (JSON) form, but the structure of the data can be easily seen when executing on the server, since it is generating the messages. Thus, input generation on the client application can make use of this information.

Combined Concrete and Symbolic Execution in the Presence of Interactive User Input The technique of the present invention for finding failures in PHP applications is a variation on combined concrete and symbolic execution [1, 2, 3, 4, 5], a well-established test generation technique. The basic idea behind this technique is to execute an application on some initial (e.g., empty or randomly chosen) input, and then on additional inputs obtained by solving constraints derived from exercised control flow paths. Failures that occur during these executions are reported to the user.

On Demand Deployment

Detecting and localizing security vulnerabilities in client-server application, in one embodiment, is implemented in an on-demand environment. This on demand embodiment provides a shared architecture to simultaneous serve multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Non-limiting Hardware Embodiments

Overall, the present invention can be realized in hardware or a combination of hardware and software. The processing system, according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits 1112 connected to network 1138. Furthermore, the computer readable medium may comprise computer readable information in a transitory state medium such as a network link and/or a network interface, including a wired network or a wireless network, that allow a computer system to read such computer readable information.

Figure 11:
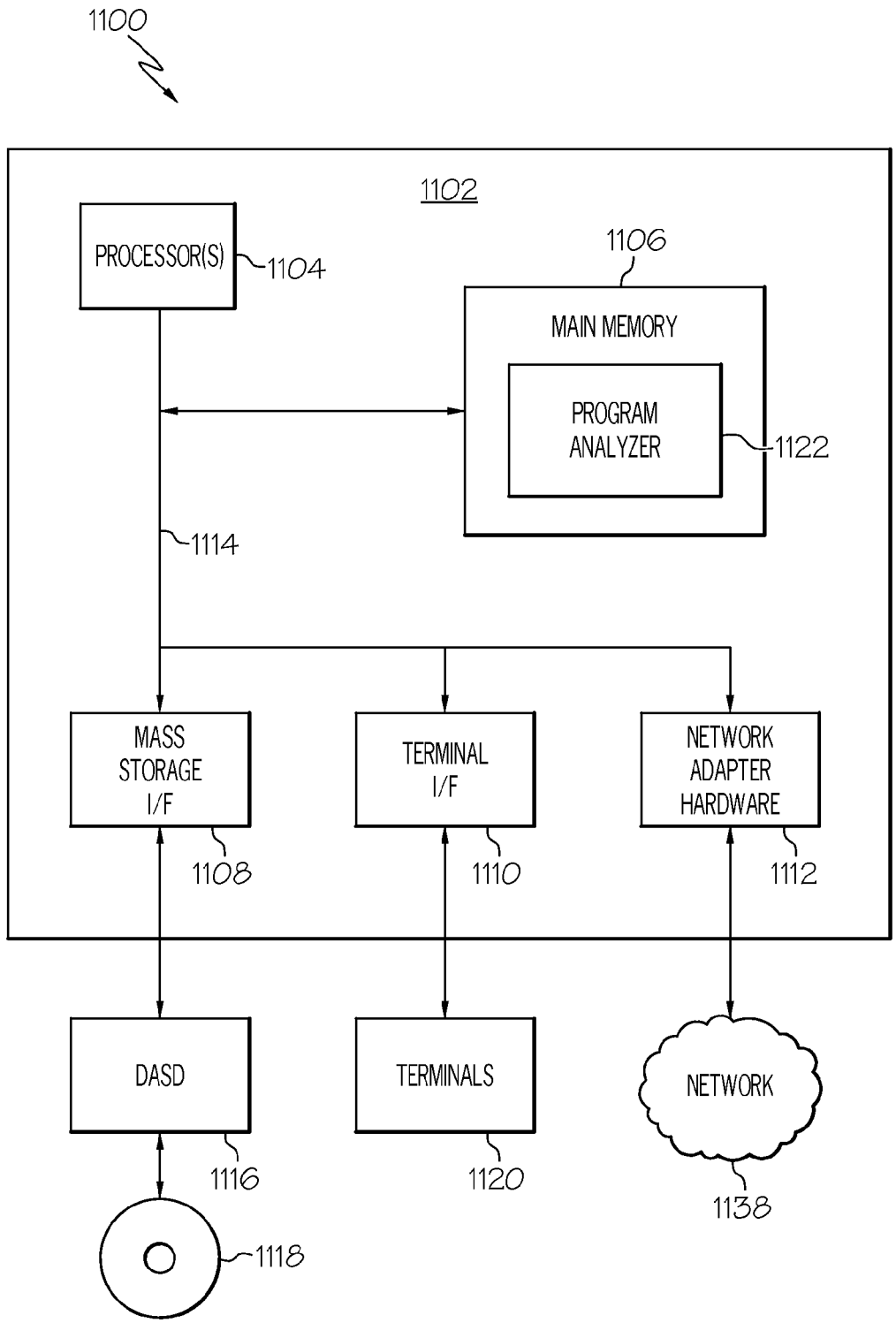
FIG. 11 is a block diagram of a computer system useful for implementing the software steps of the present invention.

An example of a computer system 1100 is shown in FIG. 11. The computer system 1100 includes one or more processors, such as processor 1104. The processor 1104 is connected to a communication infrastructure 1102 such as a communications bus, crossover bar, or network. Various software embodiments are described in terms of this exemplary computer system. After reading this description, it will become apparent to a person of ordinary skill in the relevant art(s) how to implement the invention using other computer systems and/or computer architectures.

Computer system 1100 includes a display interface 1110 that forwards graphics, text, and other data from the communication infrastructure 1102 (or from a frame buffer not shown) for display on the display unit 1120. Computer system 1100 also includes a main memory 1106, preferably random access memory (RAM), and optionally includes a secondary memory 1112. The secondary memory 1108 includes, for example, a hard disk drive 1116 and/or a removable storage drive 1118, representing a floppy disk drive, a magnetic tape drive, an optical disk drive, etc. The removable storage drive 1116 reads from and/or writes to a removable storage unit 1118 in a manner well known to those having ordinary skill in the art. Removable storage unit 1118, represents a floppy disk, magnetic tape, optical disk, etc. which is read by and written to by removable storage drive 1116. As will be appreciated, the removable storage unit 1118 includes a computer usable storage medium having stored therein computer software and/or data.

In alternative embodiments, the secondary memory 1112 includes other similar means for allowing computer programs or other instructions to be loaded into computer system 1100. Such means include, for example, a removable storage unit 1118 and an interface 1108. Examples of such include a program cartridge and cartridge interface (such as that found in video game devices), a removable memory chip (such as an EPROM, or PROM) and associated socket, and other removable storage units 1116 and interfaces 1108 which allow software and data to be transferred from the removable storage unit 1118 to computer system 1100.

N-Tiered Architecture

Figure 12:
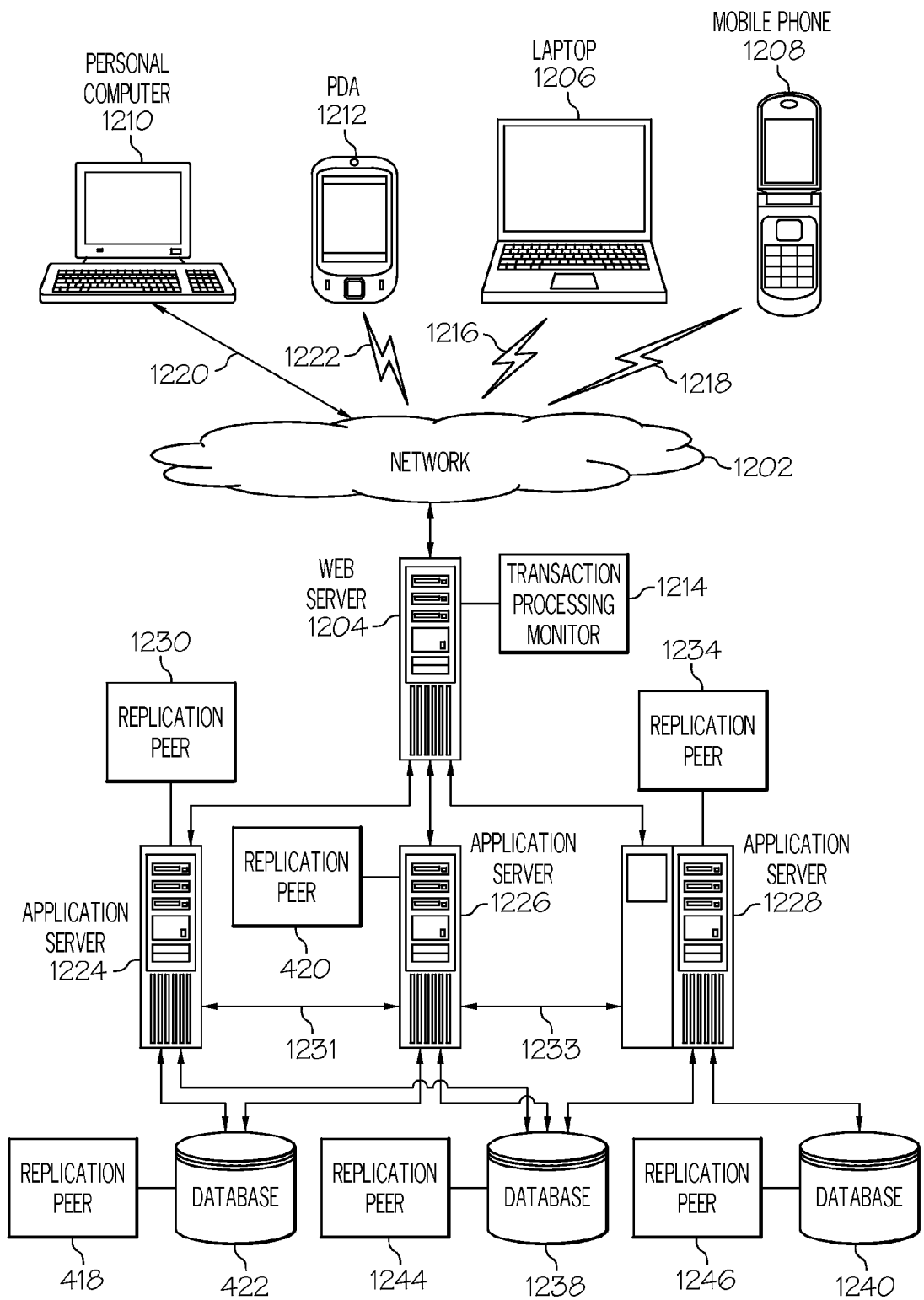
FIG. 12 is a block diagram that illustrates the n-tier architecture useful for implements the software steps of the present invention in another embodiment.

FIG. 12 is a block diagram that illustrates the n-tier architecture useful in implementing the present invention in another embodiment. It is important to note that although only a 3-tier architecture is shown, those of average skill in the computing arts will appreciate that this architecture can be easily extended to four or more tiers as in a multi-tier or n-tier system.

Referring to FIG. 12 shown is a multi-tier system architecture with a tier of clients 1210, 1212, 1206, 1208, a tier of application servers 1224, 1226, 1228, and a tier of non-volatile storage in databases 1238, 1240. This multi-tier client/server architecture improves performance and flexibility for systems with a large number of users. Flexibility in partitioning can be as simple as "dragging and dropping" application code modules onto different computers in some multi-tier architectures.

This multi-tiered system has evolved from a more conventional system architecture in which clients retrieve information from a database, process the data according to instructions from a user, and store the data in the database. The clients in the conventional system architecture have three types of computer instructions installed and running on them to process information: code for the user interface (displaying buttons and lists of data), code for interacting with the database to fetch or store data, and code that processes the fetched data according to commands from the user interface or business logic. In contrast, in the multi-tiered system architecture, the client may contain only user interface code. The code for interacting with the database and processing the data is installed and operating on a middle-tier of servers such as application servers of FIG. 12. The middle tier of servers interacts with the database and processes data on behalf of the client. The multi-tiered system of architecture therefore has these advantages: the forced separation of user interface and business logic, a low bandwidth requirement for the network, and the concentration of business logic code in a few machines—rather than inserting business logic into all application software on all of thousand or millions of clients.

There are a variety of ways of implementing this middle tier, such as transaction processing monitors, message servers, or application servers. The middle tier can perform queuing, application execution, and database staging. For example, if the middle tier provides queuing, the client can deliver its request to the middle layer and disengage because the middle tier will access the data and return the answer to the client. In addition, the middle tier adds scheduling and prioritization for work in progress.

The exemplary web server 1204 of FIG. 12 also has installed and operating on it a transaction processing monitor (TPM) 1214. The TP monitor technology is a type of message queuing, transaction scheduling, and prioritization service where the client connects to the TP monitor (middle tier) instead of the database server. The transaction is accepted by the monitor, which queues it and then takes responsibility for managing it to completion, thus freeing up the client. The TPM 1214 provides applications' services to many clients by multiplexing client transaction requests onto a controlled number of processing routines that support particular services.

The system of FIG. 12 includes several exemplary clients 1210, 1212, 1206, 1208. A client is a computer or a process or thread running on a computer that requests resources or services from another computer. Exemplary clients of FIG. 12 include: a personal computer 1210 coupled to the network 1202 through a wireline connection 1220, a personal digital assistant (PDA) 1212 coupled to the network 1202 through a wireless connection 1222, a laptop computer 1206 coupled to the network 1202 through a wireless connection 1216, and a mobile telephone 1208 which is coupled to the network 1202 through a wireless connection 1218.

The system of FIG. 12 includes a data communications network 1202 which provides for data communications among clients 1210, 1212, 1206, 1208 and web server 1204. A network is a group of computers coupled for data communications according to data communications protocols through other computers typically referred to as routers, bridges, or switches. (The routers, bridges, and switches are not shown on FIG. 12.

The system of FIG. 12 includes web server 1204. A server is a computer or a process or thread running on a computer that receives, processes, and responds to requests for resources or services from another computer. A web server is a server that carries out data communication according to a hyperlinking protocol. A common example of a hyperlinking protocol is the HyperText Transfer Protocol, the foundation of the World Wide Web. The term 'web server' is used in this specification more broadly, however, to refer to any server that support any hyperlinking protocol, including, for example, the Wireless Access Protocol (WAP), the Handheld Device Transport Protocol (HDTP), and others as will occur to those of skill in the art. The web server 1204 provides static web pages in responses to clients as well as dynamic web pages in such formats as Java Server Pages (JSP), PHP Hypertext Processor (PHP) pages, Microsoft's Active Server Pages (ASP), and Common Gateway Interface (CGI) scripts, and others as will occur to those of skill in the art.

Some caution is advised in use of the terms 'client' and 'server' because whether a particular computer acts as a client or a server depends upon role. In the system of FIG. 12, for example, when web server 1214 receives from personal computer 1210 a request for a web page, web server 1204 is acting as a server; when, however, web server 1204 requests resources from application server 1224 in order to fulfill the request from personal computer 1210, web server 1204 acts as a client.

The system of FIG. 12 also includes application servers 1224, 1226, 1228 coupled for data communications to web server 1204. The application servers 1224, 1226, 1228 are also connected to databases 1238, 1240 and to each other 1231, 1233. The system of FIG. 12 also includes non-volatile storage in the form of databases 1238, 1240. The application servers 1224, 1226, 1228 and the databases 1238,1240 have installed and operating on them replication peers 1230, 1234, 1244, 1246. A peer is a computer or a process or thread running on a computer that has the same capabilities of requesting and responding to requests as other computers similarly situated in a network. A replication peer is a software module that stores on a replication medium sessions flushed from a replication queue. A replication peer 1244, 1246 may store a session from an application server 1224, 1226, 1228 to non-volatile storage in a database 1238, 1240. A replication peer 1230, 1234 also may store 1231, 1233 a session from an application server 1224, 1226, 1228 into remote random access memory on another application server.

The arrangement of servers and other devices making up the exemplary system illustrated in FIG. 12 are for explanation, not for limitation. Data processing systems useful according to various embodiments of the present invention may include additional servers, routers, other devices, and peer-to-peer architectures, not shown in FIG. 12, as will occur to those of skill in the art. Networks in such data processing systems may be implemented as local area networks (LANs), wide area networks (WANs), intranets, internets, and others as will occur to those of skill in the art. Networks in such data processing systems may support many data communications protocols, including, for example, the Transmission Control Protocol (TCP), the Internet Protocol (IP), the HyperText Transfer Protocol (HTTP), the Wireless Access Protocol (WAP), the Handheld Device Transport Protocol (HDTP), and others as will occur to those of skill in the art. Various embodiments of the present invention may be implemented on a variety of hardware platforms in addition to those illustrated in FIG. 12.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

References

The following references are hereby incorporated by reference in their entirety.

[1] C. Cadar, V. Ganesh, P. M. Pawlowski, D. L. Dill, and D. R. Engler. EXE: automatically generating inputs of death. In CCS, 2006.

[2] P. Godefroid, N. Klarlund, and K. Sen. DART: Directed automated random testing. In PLDI, 2005.

[3] P. Godefroid, M. Y. Levin, and D. Molnar. Automated whitebox fuzz testing. In NDSS, 2008.

[4] K. Sen, D. Marinov, and G. Agha. CUTE: A concolic unit testing engine for C. In FSE, 2005.

[5] G. Wassermann, D. Yu, A. Chander, D. Dhurjati, H. Inamura, and Z. Su. Dynamic test input generation for web applications. In ISSTA, pages 249-260, 2008.

[6] S. Artzi, J. Dolby, S. Holm Jensen, A. Willer, F. Tip, "A Framework For Automated Testing of JavaScript Web Applications" accepted for publication in ICSE 2011.

[7] Artzi, et al., "Finding bugs in web applications using dynamic test generation and explicate model checking." IEEE Transactions on Software Engineering, 2010.

[8] Shay Artzi, Julian Dolby, Frank Tip and Marco Pistoia. "Practical Fault Localization for Dynamic Web Applications" in ICSE 2010.

[9] Shay Artzi, Julian Dolby, Frank Tip and Marco Pistoia. "Directed Test Generation for Effective Fault Localization

What is claimed is:

1. A computer-implemented method for analyzing a set of two or more communicating applications comprising a plurality of code fragments, the computer-implemented method comprising:
  receiving at least a portion of code fragments as part of a first application and receiving at least a portion of the code fragments as part of a second application, wherein the first application and the second application communicate with each other during execution;
  receiving an initial input for executing the first application and the second application;
  adding the initial input to a set of inputs;
  performing the following at least once:
    selecting one or more inputs out of the set of inputs for execution;
    executing, using one or more of the selected inputs, at least one of:
      a) the portion of the code fragments as part of the second application concretely and symbolically to record a second application path constraint and to record second application information communicated to the portion of the code fragments as part of the first application and generating a set of one or more new second application inputs for the portion of the code fragments as part of the second application based the second application path constraint and information communicated from the first application to the second application; and
      b) the portion of the code fragments as part of the first application concretely and symbolically to record a first application path constraint and to record first application information communicated to the portion of the code fragments as part of the second application and generating a set of one or more new first application inputs for the portion of the code fragments as part of the first application based the first application path constraint and information communicated from the second application to the first application; and
    adding to the set of inputs at least one or more of new first application inputs and new second application inputs.

2. The computer implemented method of claim 1, wherein the performing the following at least once includes repeating until at least one of:
  a coverage budget for at least one of the first application and second application;
  a given budget for a number of faults for at least one of the first application and second application;
  a time budget; and
  a computational budget is met.

3. The computer implemented method of claim 1, further comprising:
  receiving an initial state of an environment for executing the first application and the second application.

4. The computer implemented method of claim 1, wherein the set of inputs is at least one of:
  an input from the first application executing as client code to the second application executing as sever code; and
  a portion of the first application is generated by the portion of code fragments as part of the second application.

5. The computer implemented method of claim 1, wherein the first application is a client application written in a Java programming language.

6. The computer implemented method of claim 1, wherein the second application is a server application written in a PHP (Hypertext Processor Pages) programming language.

7. The computer implemented method of claim 1, wherein the generating a set of one or more new second application inputs for the portion of the code fragments as part of the second application includes using an analyzer to an input generator based on the second application path constraint and information communicated from the first application to the second application.

8. The computer implemented method of claim 1, wherein the generating a set of one or more new first application inputs for the portion of the code fragments as part of the first application includes using an analyzer to an input generator based on the first application path constraint and information communicated from the second application to the first application.

9. A computer program product for analyzing a set of two or more communicating applications comprising a plurality of code fragments, the computer program product comprising:
  a non-transitory storage memory readable by a computer system, the computer readable medium storing software programming instructions capable of performing with a processor programming code to carry out:

receiving at least a portion of code fragments as part of a first application and receiving at least a portion of the code fragments as part of a second application, wherein the first application and the second application communicate with each other during execution;

receiving an initial input for executing the first application and the second application;

adding the initial input to a set of inputs;

performing the following at least once:
- selecting one or more inputs out of the set of inputs for execution;
- executing, using one or more of the selected inputs, at least at least one of:
  - a) the portion of the code fragments as part of the second application concretely and symbolically to record a second application path constraint and to record second application information communicated to the portion of the code fragments as part of the first application and generating a set of one or more new second application inputs for the portion of the code fragments as part of the second application based the second application path constraint and information communicated from the first application to the second application; and
  - b) the portion of the code fragments as part of the first application concretely and symbolically to record a first application path constraint and to record first application information communicated to the portion of the code fragments as part of the second application and generating a set of one or more new first application inputs for the portion of the code fragments as part of the first application based the first application path constraint and information communicated from the second application to the first application; and adding to the set of inputs at least one or more of new first application inputs and new second application inputs.

10. The computer program product of claim 9, wherein the performing the following at least once includes repeating until at least one of:
- a coverage budget for at least one of the first application and second application;
- a given budget for a number of faults for at least one of the first application and second application;
- a time budget; and
- a computational budget is met.

11. The computer program product of claim 9, further comprising:
receiving an initial state of an environment for executing the first application and the second application.

12. The computer program product of claim 9, wherein the set of inputs is at least one of:
- an input from the first application executing as client code to the second application executing as sever code; and
- a portion of the first application is generated by the portion of code fragments as part of the second application.

13. The computer program product of claim 9, wherein the first application is a client application written in a Java programming language.

14. The computer program product of claim 9, wherein the second application is a server application written in a PHP programming language.

15. The computer program product of claim 9, wherein the generating a set of one or more new second application inputs for the portion of the code fragments as part of the second application includes using an analyzer to an input generator based on the second application path constraint and information communicated from the first application to the second application.

16. The computer program product of claim 9, wherein the generating a set of one or more new first application inputs for the portion of the code fragments as part of the first application includes using an analyzer to an input generator based on the first application path constraint and information communicated from the second application to the first application.

17. A system for analyzing a set of two or more communicating applications comprising a plurality of code fragments, the system comprising:
- a computer memory capable of storing machine instructions; and
- a processor in communication with said computer memory, said processor capable of accessing said machine instructions to perform:

receiving at least a portion of code fragments as part of a first application and receiving at least a portion of the code fragments as part of a second application, wherein the first application and the second application communicate with each other during execution;

receiving an initial input for executing the first application and the second application;

adding the initial input to a set of inputs;

performing the following at least once:

selecting one or more inputs out of the set of inputs for execution;

executing, using one or more of the selected inputs, at least at least one of:
- a) the portion of the code fragments as part of the second application concretely and symbolically to record a second application path constraint and to record second application information communicated to the portion of the code fragments as part of the first application and generating a set of one or more new second application inputs for the portion of the code fragments as part of the second application based the second application path constraint and information communicated from the first application to the second application; and
- b) the portion of the code fragments as part of the first application concretely and symbolically to record a first application path constraint and to record first application information communicated to the portion of the code fragments as part of the second application and generating a set of one or more new first application inputs for the portion of the code fragments as part of the first application based the first application path constraint and information communicated from the second application to the first application; and adding to the set of inputs at least one or more of new first application inputs and new second application inputs.

18. The system of claim 17, wherein the performing the following at least once includes repeating until at least one of:
- a coverage budget for at least one of the first application and second application;
- a given budget for a number of faults for at least one of the first application and second application;
- a time budget; and
- a computational budget is met.

19. The system of claim 17, further comprising:
receiving an initial state of an environment for executing the first application and the second application.

20. The system of claim 17, wherein the set of inputs is at least one of:
   an input from the first application executing as client code to the second application executing as sever code; and
   a portion of the first application is generated by the portion of code fragments as part of the second application.

21. The system of claim 17, wherein the first application is a client application written in a Java programming language.

22. The system of claim 17, wherein the second application is a server application written in a PHP programming language.

23. The system of claim 17, wherein the generating a set of one or more new second application inputs for the portion of the code fragments as part of the second application includes using an analyzer to an input generator based on the second application path constraint and information communicated from the first application to the second application.

24. The system of claim 17, wherein the generating a set of one or more new first application inputs for the portion of the code fragments as part of the first application includes using an analyzer to an input generator based on the first application path constraint and information communicated from the second application to the first application.

* * * * *